United States Patent
Beeson (10) Patent No.: US 7,305,305 B2
(45) Date of Patent: Dec. 4, 2007

(54) SYSTEM AND METHOD FOR REMOTELY CONTROLLING LOGGING EQUIPMENT IN DRILLED HOLES

(75) Inventor: Nick Beeson, Aberdeenshire (GB)

(73) Assignee: Baker Hughes Incorporated, Houston, TX (US)

( * ) Notice: Subject to any disclaimer, the term of this patent is extended or adjusted under 35 U.S.C. 154(b) by 73 days.

(21) Appl. No.: 11/290,245

(22) Filed: Nov. 30, 2005

(65) Prior Publication Data

US 2006/0143234 A1 Jun. 29, 2006

Related U.S. Application Data

(60) Provisional application No. 60/634,501, filed on Dec. 9, 2004.

(51) Int. Cl.
*G01V 11/00* (2006.01)
(52) U.S. Cl. .......................................................... 702/6
(58) Field of Classification Search .................... 702/6, 702/7, 9
See application file for complete search history.

(56) References Cited

U.S. PATENT DOCUMENTS

| | | | | | |
|---|---|---|---|---|---|
| 4,794,534 | A | * | 12/1988 | Millheim | 702/9 |
| 5,220,963 | A | * | 6/1993 | Patton | 175/24 |
| 6,021,377 | A | * | 2/2000 | Dubinsky et al. | 702/9 |
| 6,101,445 | A | * | 8/2000 | Alvarado et al. | 702/9 |
| 6,233,524 | B1 | * | 5/2001 | Harrell et al. | 702/9 |
| 6,519,568 | B1 | * | 2/2003 | Harvey et al. | 705/1 |
| 6,560,565 | B2 | * | 5/2003 | Roy et al. | 702/188 |
| 7,032,689 | B2 | | 4/2006 | Goldman et al. | 175/39 |
| 2004/0051650 | A1 | | 3/2004 | Gonsoulin et al. | 340/853.1 |
| 2005/0161260 | A1 | | 7/2005 | Koithan et al. | 175/57 |
| 2005/0189142 | A1 | | 9/2005 | Ernesto | 175/24 |

FOREIGN PATENT DOCUMENTS

| | | |
|---|---|---|
| EP | 1 245 783 A3 | 12/2002 |
| GB | 2 330 598 A | 4/1999 |
| GB | 2 385 343 A | 8/2003 |

OTHER PUBLICATIONS

UK Search Report, Application No. GB0600498.0, May 24, 2006.
Norwegian Search Report, Application No. 2005.5239, Jul. 14, 2006, one page.
Schumberger, Reservoir Evaluation Wireline—World's First Remote Logging Operations To Improve Efficiency and Reduce Cost, Oct. 6, 2005, p. 19.

* cited by examiner

*Primary Examiner*—Donald E McElheny, Jr.
(74) *Attorney, Agent, or Firm*—Cantor Colburn LLP (57) ABSTRACT

A system and a method for remotely controlling logging equipment in drilled holes are provided. The method includes inputting a first command associated with either a logging tool or a hoist device coupled to the logging tool utilizing an input device operably coupled to a first computer. The first computer is located at a position remote from the logging tool. The method further includes transmitting a first communication signal having the first command from the first computer to a second computer. The method further includes controlling operation of either the logging tool or the hoist device based on the first command utilizing the second computer.

22 Claims, 5 Drawing Sheets

SYSTEM AND METHOD FOR REMOTELY CONTROLLING LOGGING EQUIPMENT IN DRILLED HOLES

CROSS REFERENCE TO RELATED APPLICATIONS

The application claims the benefit of U.S. Provisional application, Ser. No. 60/634,501, filed Dec. 9, 2004, the contents of which are incorporated herein by reference thereto.

BACKGROUND OF THE INVENTION

Drilling and production installations have been constructed in offshore locations that use wells to retrieve hydrocarbons from geological formations under the ocean floor. These installations utilize computer systems to control equipment that is used in retrieving the hydrocarbons, including downhole drilling equipment and surface pumps for example.

Logging tools are deployed into the wells to send information about the subsurface geological formations and hydrocarbon data to a computer system on the surface. In recent years, computer systems have been developed to remotely monitor the operation of the logging tools. However, the computer systems do not allow an engineer at a remote location, such as an onshore location, to remotely control the operation of the logging tools and the hoist equipment. Thus, the engineer must be physically present at the drilling or production installation to control operation of the logging tools and the hoist equipment.

The inventor herein has recognized that it would be beneficial to have a system that allows an engineer at a remote location to remotely control both a logging tool and the hoist equipment related thereto at a drilling or production installation.

BRIEF DESCRIPTION OF THE INVENTION

A method for remotely controlling logging equipment in a drilled hole in accordance with an exemplary embodiment is provided. The method includes specifying a first command associated with either a logging tool or a hoist device coupled to the logging tool utilizing an input device operably coupled to a first computer. The first computer is located at a position remote from the logging tool. The method further includes transmitting a first communication signal having the first command from the first computer to a second computer. The method further includes controlling operation of either the logging tool or the hoist device based on the first command utilizing the second computer.

A system for remotely controlling logging equipment in a drilled hole in accordance with another exemplary embodiment is provided. The system includes a first computer configured to allow an operator to specify a first command associated with either the logging tool or a hoist device coupled to the logging tool. The first computer is located at a position remote from the logging tool. The system further includes a first communication device operably communicating with the first computer configured to transmit a first communication signal having the first command. The system further includes a second communication device configured to receive the first communication signal. The system further includes a second computer operably communicating with the second communication device. The second computer is configured to control operation of either the logging tool or the hoist device based on the first command.

Other systems and/or methods according to the embodiments will become or are apparent to one with skill in the art upon review of the following drawings and detailed description. It is intended that all such additional systems and methods be within the scope of the present invention, and be protected by the accompanying claims.

DETAILED DESCRIPTION OF THE INVENTION

Figure 1:
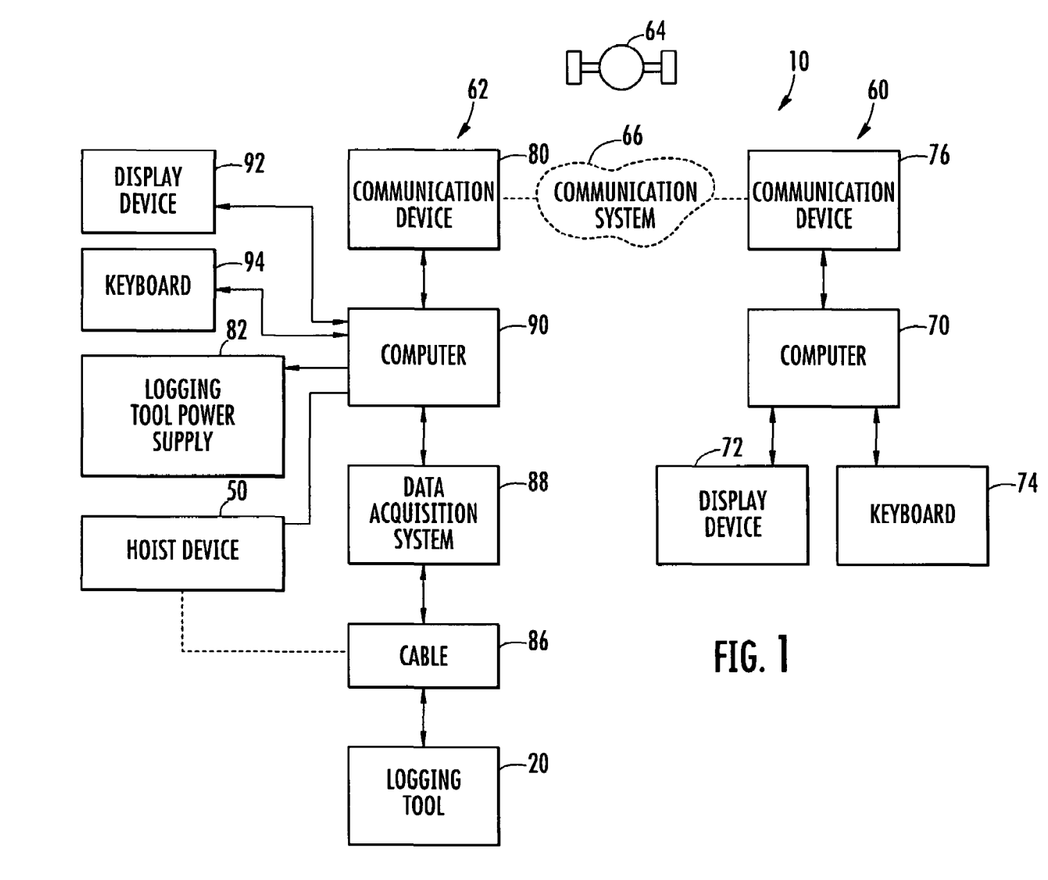
FIG. 1 is a block diagram of a system for remotely controlling logging equipment in accordance with an exemplary embodiment.
Figure 2:
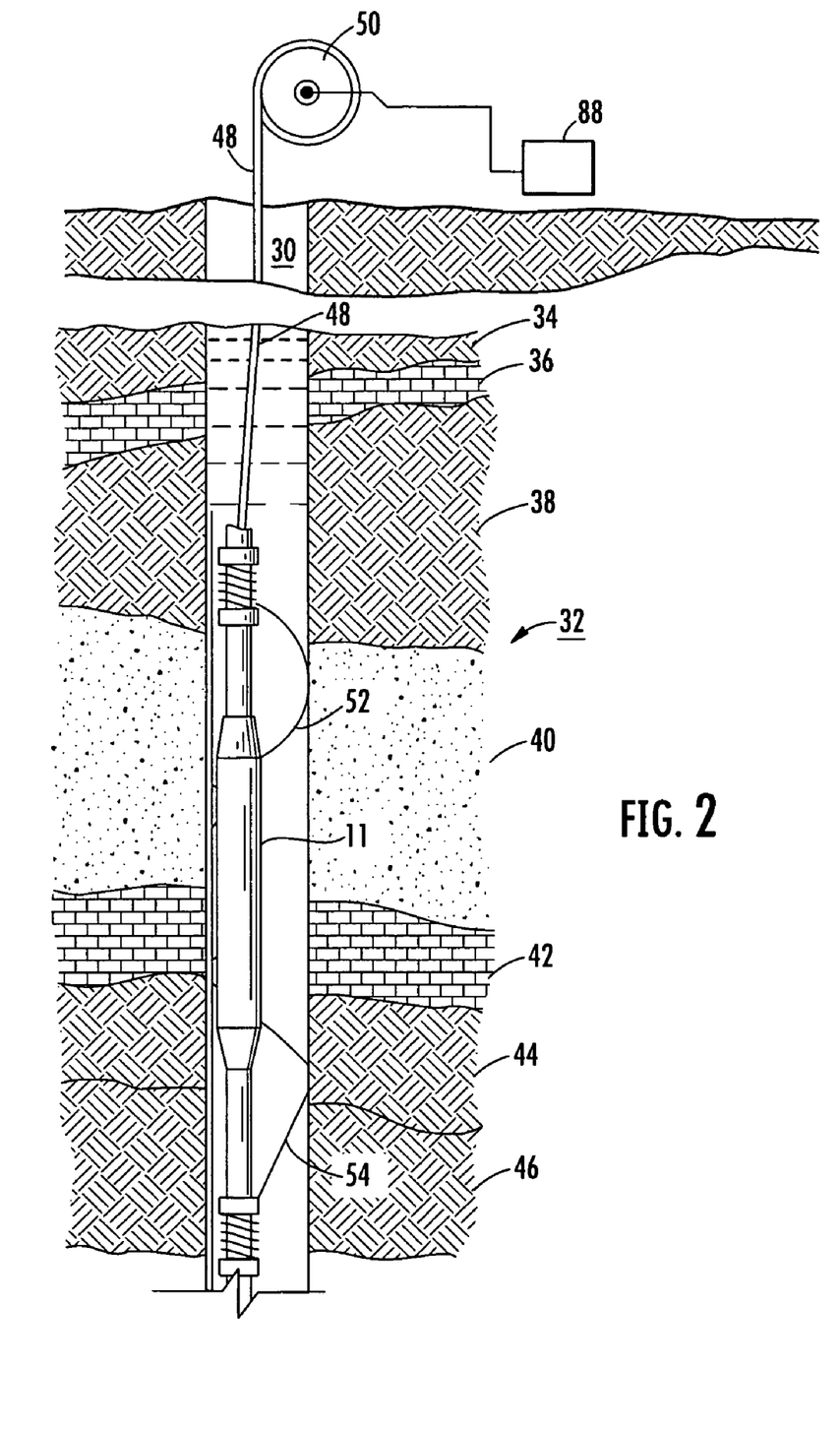
FIG. 2 is a schematic of a logging tool disposed within a well bore of a geological formation.

Referring to FIGS. 1 and 2, a system 10 for remotely controlling a logging tool 20 and a hoist 50 coupled to the tool 20 are provided. The logging tool 20 comprises any tool or device that is operably coupled to a wireline in a drilled hole. For example, the logging tool 20 can comprise at least one of a wireline logging tool, a perforating gun for forming holes in a well casing, a tubular cutting device for cutting tubes disposed within the well casing, a mechanical setting device for positioning tubes and other equipment within the well casing.

In one exemplary embodiment, the logging tool 20 comprises a wireline logging tool that acquires and transmits data (i.e., logs data) relating to a subsurface geological formation. The wireline logging tool comprises any one of a plurality of logging devices capable of measuring geological values or hydrocarbon values of a geological formation, or other down hole values, known to those skilled in the art. For example, the wireline logging tool is configured to measure one or more of the following values associated with the geological formation 32: (i) a resistivity value, (ii) a density value, (ii) a porosity value, (iii) a natural gamma radiation value, (iv) a borehole image, (v) an acoustic travel time value, (vi) a nuclear magnetic resonance value, (vii) a pressure value, (viii) a well production value, (ix) a residual hydrocarbon saturation value, and (x) a temperature value, or the like. In the illustrated exemplary embodiment, the logging tool 20 is lowered via a cable 48 into a drilled hole or borehole 30 that extends through the subsurface geological formation 32, having layers 34, 36, 38, 40, 42, 44, 46. As the logging tool 20 is lowered within the borehole 30, the tool 20 communicates one or more measured values through the cable 86 to the data acquisition system 88, described in further detail below. Further, the logging tool 20 is urged against the side of the borehole 30 via bow springs or motor-controlled arms 52, 54.

Referring to FIG. 1, the system 10 for controlling the logging tool 20 includes a remote control system 60, a local control system 62, and a satellite 64. In an alternate embodiment of system 10, the satellite 64 can be replaced with a communication system 66 for allowing to communication between the local control system 62 and the remote control system 60.

The remote control system 60 is provided to transmit wireless digital communication signals (e.g., RF signals) having operational commands to the local control system 62 for controlling the logging tool 20 or the hoist device 50 coupled to the tool 20. Further, the remote control system 60 is provided to receive measured parameters from the logging tool 24 for viewing by an operator. The remote control system 60 includes a computer 70, a display device 72, a keyboard 74, and a communication device 76. The remote control system 60 is located at a remote location from the local control system 62. For example, the remote control system 60 can be located onshore and the local control system 62 can be located on a drilling or production oil rig located offshore. Further, for example, both the remote control system 60 and the local control system 62 can be located onshore but disposed remote from one another.

The computer 70 is provided to allow an operator to specify one or more commands, such as operational commands, via the keyboard 74 that is displayed on the display device 72. Further, the computer 70 is configured to induce the communication device 76 to transmit a first wireless communication signal having the operational command. The command comprises any command, instruction (e.g., input value, or selected value) for controlling operation of the logging tool, the hoist device 50, or the power supply 82. For example, the command can comprise one or more of the following: (i) an instruction to measure a specific geological or down hole parameter, (ii) an instruction to actuate a device in the logging tool, (ii) an instruction for moving the logging tool from a first position, (iii) an instruction for applying power to the logging tool or to the hoist device, (iv) an instruction for removing power from the logging tool or from the hoist device, (v) an instruction for modifying measurement parameters utilized by the logging tool and (vi) an instruction for performing a diagnostic test on a computer or the logging tool. Examples of down hole parameters include a temperature level and a mud pressure level. The computer 70 is also configured to induce the display device 72 to display measured parameters received from the remote control system 60. As shown, the computer 70 is operably coupled to the display device 72, the keyboard 74, and the communication device 76.

The communication device 76 comprises a transceiver that transmits wireless digital communication signals having commands, such as operational commands or diagnostic commands, to the satellite 64 for retransmission to the local control system 62. In an alternative embodiment, the communication device 76 comprises a device hardwired to the communication system 66 for transmitting communication signals between the remote control system 60 and the local control system 62. For example, in the alternative embodiment, the communication device 76 can comprise a modem or a router, or the like. In another alternative embodiment, the communication device 76 comprises a transmitter and receiver for transmitting and receiving RF signals, respectively.

The satellite 64 is provided to transmit wireless communication signals, such as RF signals, between the local control system 62 and the remote control system 60, and vice versa. In an alternative embodiment, the communication system 66 can replace the satellite 64. In the alternative embodiment, the communication system 66 can comprise one or more of the following: (i) a wide-area network, (ii) an Internet system, and (iii) a POTs system, operably coupled between the communication devices 80, 76.

The local control system 62 is provided to control operation of the logging tool 20, the hoist device 50, and the power supply 82, based upon operational commands received from the remote control system 60. The local control system 62 includes the communication device 80, the power supply 82, the hoist device 50, the cable 86, the data acquisition system 88, a computer 90, a display device 92, and a keyboard 94. It should be noted that the local control system 62 can also control operation of the logging tool 20 independent of the remote control system 60 if needed.

The communication device 80 comprises a transceiver that transmits wireless digital communication signal having a measured parameter to the satellite 64 for retransmission to the remote control system 60. In an alternate embodiment, the communication device 80 comprises a device hardwired to the communication system 66 for transmitting communication signals between the remote control system 60 and the local control system 62. For example, in the alternate embodiment, the communication device 76 can comprise a modem or a router, or the like. As shown, the communication device 80 is operably coupled to the computer 90. In another alternative embodiment, the communication device 80 comprises a transmitter and a receiver for transmitting and receiving RF signals, respectively.

The logging tool power supply 82 is provided to supply power to the logging tool 20 via the cable 86. In particular, the power supply 82 provides power to the logging tool 20 in response to a control signal received from the computer 90. As shown, the power supply 82 is operably coupled to the computer 90.

The hoist device 50 is provided to raise or lower the logging tool 20 within the drilled hole 30 via the cable 48. In particular, the hoist device 50 controls movement of the logging tool 20 in response to a control signal received from the computer 90.

The cable 86 is provided to route power between the power supply 82 to the logging tool 20. Further, the cable 86 is provided to route signals indicative of measured parameters from the logging tool 20 to the data acquisition system 88. Further, the cable 86 is provided to route signals indicative of operational commands to the logging tool 24 for controlling operation of the tool 20.

The data acquisition system 88 is provided to receive measured parameters from the logging tool 20 via the cable 86 and to transmit the measured parameters to the computer 90. Further, the data acquisition system 88 is provided to receive operational commands from the computer 90 and to transmit the operational commands to the logging tool 20 via the cable 86. As shown, the data acquisition system 88 is operably coupled between the computer 90 and the cable 86.

The computer 90 is provided to receive commands from the remote control system 68 and to control operation of the logging tool 20 in response to the commands. Further, the computer 90 is configured to generate a control signal to induce the communication device 80 to transmit a second communication signal having one or more measured parameters from the tool 20. Further, the computer 90 is configured to generate control signals to induce display device 72 to display measured parameters obtained from the logging tool 20. Further, the computer 90 is configured to generate control signals to induce the power supply 82 to either supply power to the logging tool 20 or to remove power from the logging tool. Still further, the computer 90 is configured to generate a control signal to induce the hoist device 50 to move the tool 20 to a predetermined position or at a predetermined speed in a predetermined direction. Further, the computer 90 is configured to perform diagnostic tests on computer 90 and on the logging tool 20. As shown, the computer 90 is operably coupled to the display device 92, the keyboard 94, the communication device 80, the power supply 82, the hoist device 50, and the data acquisition system 88.

Figure 3:
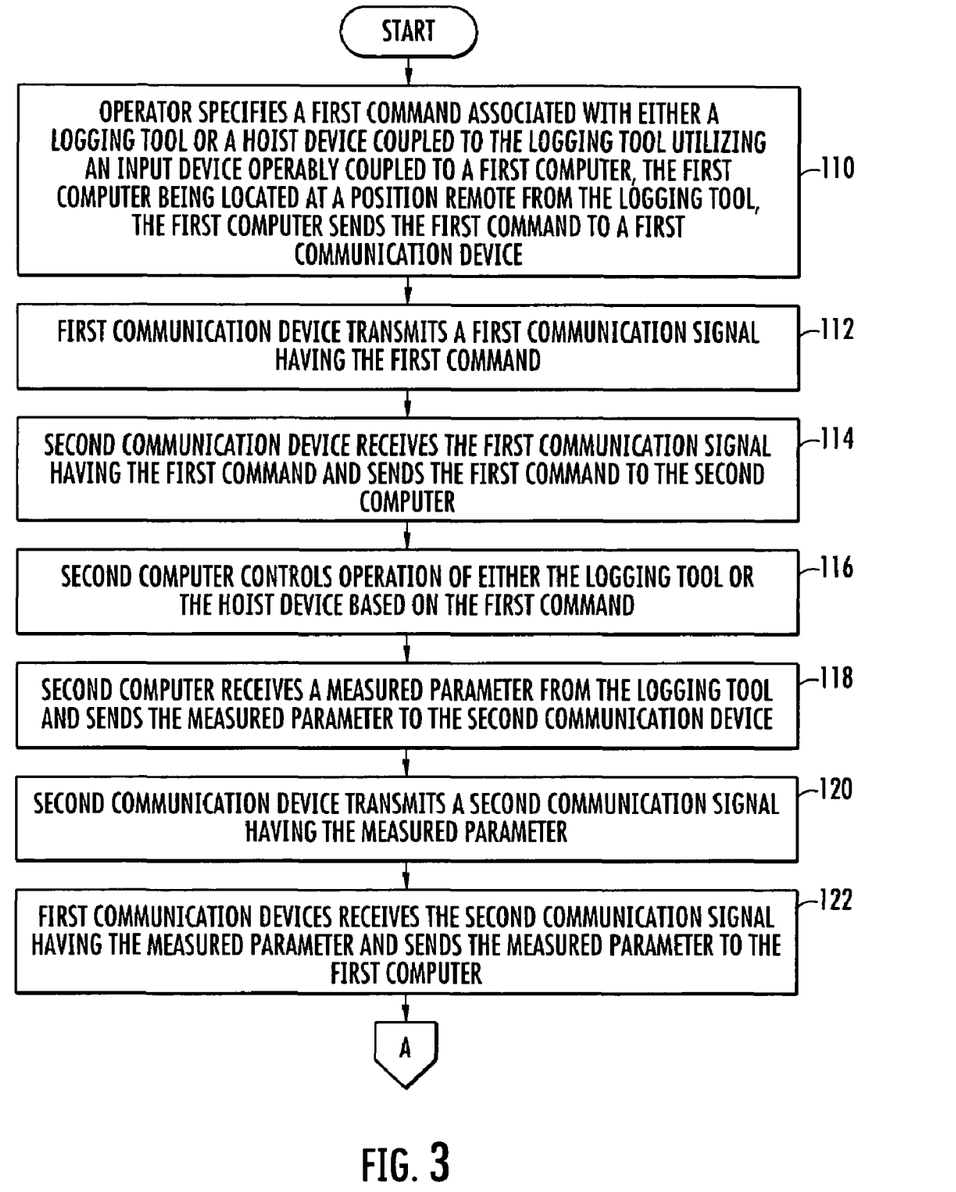
FIGS. 3-5 are flowcharts of a method for remotely controlling logging equipment in accordance with another exemplary embodiment.
Figure 4:
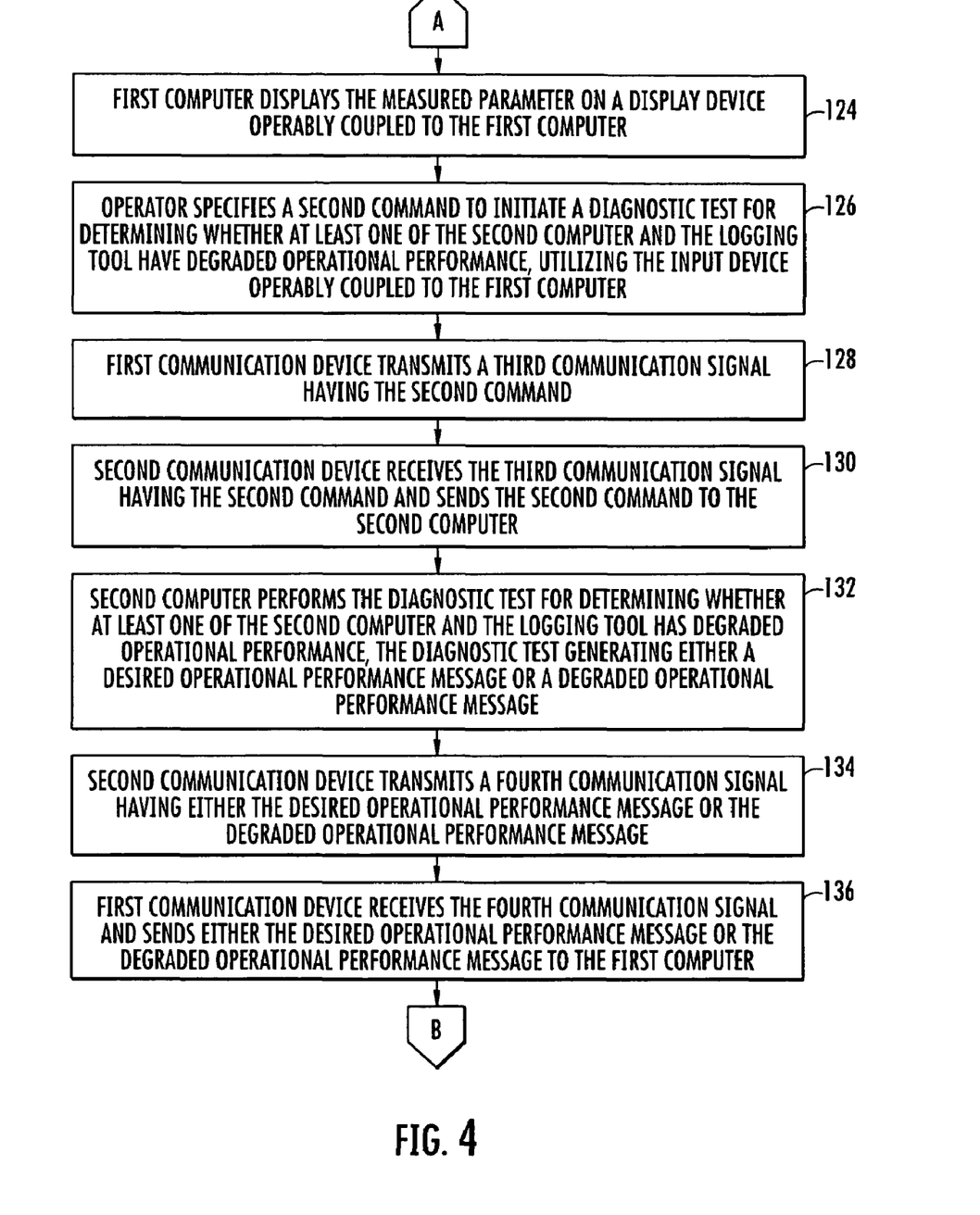
Figure 5:
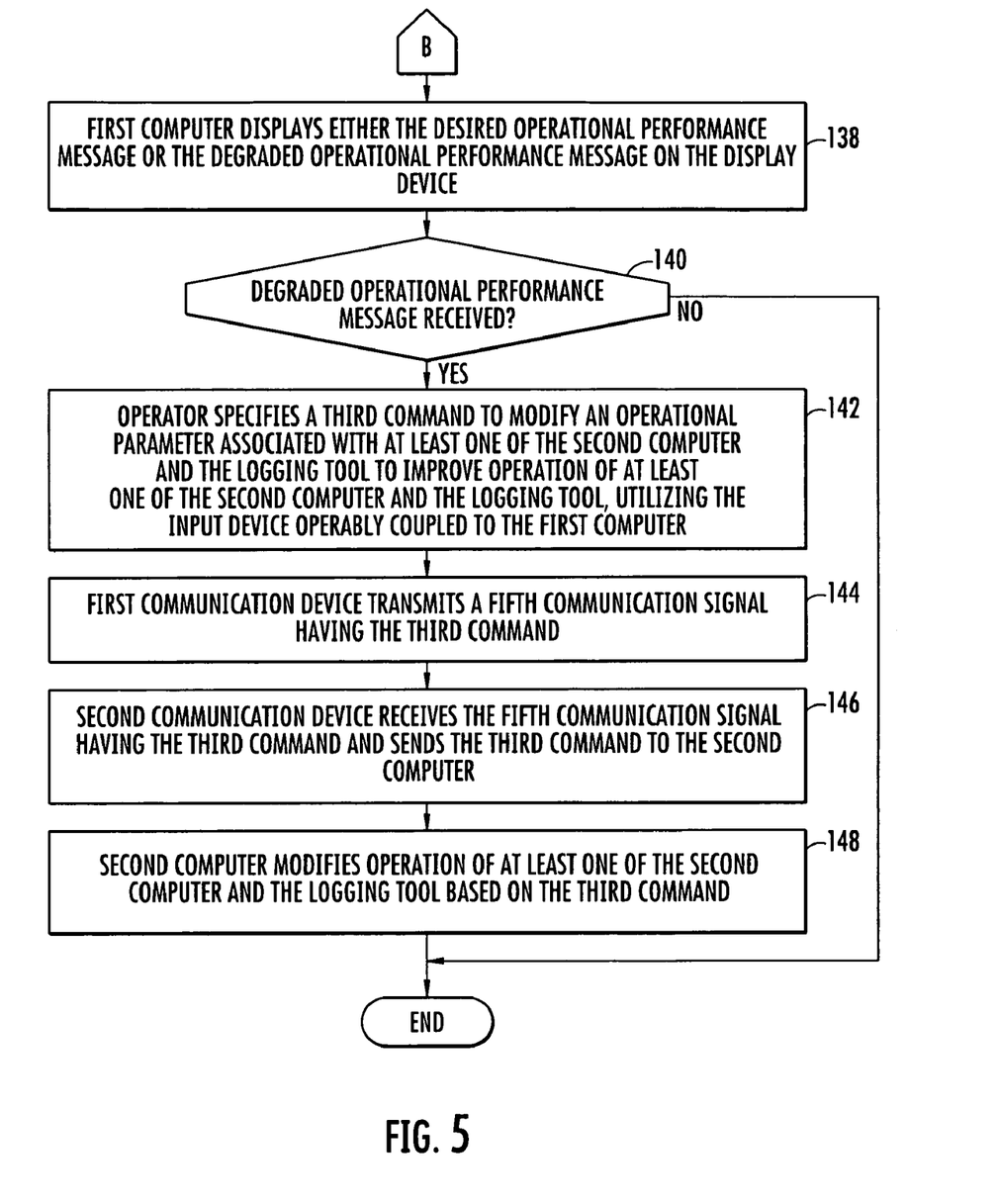

Referring to FIGS. 3-5, a method for remotely controlling logging equipment will be explained. In particular, the method can be implemented in software executing on both the computer 70 and the computer 90.

At step 110, an operator specifies an operational command associated with either a logging tool 20 or the hoist device 50 coupled to the logging tool 20 utilizing an input device 74 operably coupled to the computer 70. Further, the computer 70 sends the operational command to the communication device 76. Of course, other types of input devices could be utilized to input or select an operational command. For example, a computer mouse or a voice recognition device could be operably coupled to computer 70 to input or select the operational command, instead of the keyboard 74.

Next at step 112, the communication device 76 transmits a first communication signal having the operational command.

Next at step 114, the communication device 80 receives the first communication signal having the operational command and sends the operational command to the computer 90.

Next at step 116, the computer 90 controls operation of either the logging tool 20 or the hoist device 50 based on the operational command.

Next at step 118, the computer 90 receives a measured parameter from the logging tool 20 and sends the measured parameter to the communication device 80.

Next at step 120, the communication device 80 transmits a second communication signal having the measured parameter.

Next at step 122, the communication device 76 receives the second communication signal having the measured parameter and sends the measured parameter to the computer 70.

Next at step 124, the computer 70 displays the measured parameter on the display device 72 operably coupled to the computer 70.

Next at step 126, the operator specifies a second command to initiate a diagnostic test for determining whether at least one of the computer 90 and the logging tool 20 have degraded operational performance, utilizing the input device 74 operably coupled to the computer 70.

Next at step 128, the communication device 76 transmits a third communication signal having the second command.

Next at step 130, the communication device 80 receives the third communication signal having the second command and sends the second command to the computer 90.

Next at step 132, the computer 90 performs the diagnostic test for determining whether at least one of the computer 90 and the logging tool 20 has degraded operational performance. The diagnostic test generates either a desired operational performance message or a degraded operational performance message.

Next at step 134, the communication device 80 transmits a fourth communication signal having either the desired operational performance message or the degraded operational performance message.

Next at step 136, the communication device 76 receives the fourth communication signal and sends either the desired operational performance message or the degraded operational performance message to the computer 70.

Next at step 138, the computer 70 displays either the desired operational performance message or the degraded operational performance message on the display device 72.

Next at step 140, the operator makes a determination as to whether a degraded operational performance message was received. If the value of step 140 equals "yes", the method advances to step 142. Otherwise, the method is exited.

At step 142, the operator specifies a third command to modify an operational parameter associated with at least one of the computer 90 and the logging tool 20 to improve operation of at least one of the computer 90 and the logging tool 20, utilizing the input device 74 operably coupled to the computer 70.

Next at step 144, the communication device 76 transmits a fifth communication signal having the third command.

Next at step 146, the communication device 80 receives the fifth communication signal having the third command and sends the third command to the computer 90.

Next at step 148, the computer 90 modifies operation of at least one of the computer 90 and the logging tool 20 based on the third command. After step 148, the method is exited.

The system and the method for remotely controlling a logging tool and the hoist device related thereto provide a substantial advantage over other systems and methods. In particular, the system and the method provide a technical effect of allowing an operator located at a facility remote from the logging tool and the hoist to control operation of these devices. It should be further noted that the system and method can be utilized to control logging tools in any type of well, including water wells and oil-wells for example.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and/or executed by a computer, the computer becomes an apparatus for practicing the invention. When implemented on a general-purpose microprocessor, the computer program code segments configure the microprocessor to create specific logic circuits.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited to the embodiment disclosed for carrying out this invention, but that the invention includes all embodiments falling with the scope of the intended claims. Moreover, the use of the term's first, second, etc. does not denote any order of importance, but rather the term's first, second, etc. are used to distinguish one element from another.

I claim:

1. A method for remotely controlling logging equipment in a drilled hole, comprising:
specifying a first command associated with a hoist device coupled to a logging tool utilizing an input device operably coupled to a first computer, the first computer being located at a position remote from the logging tool;
transmitting a first communication signal having the first command from the first computer to a second computer; and
controlling operation of the hoist device based on the first command utilizing the second computer.

2. The method of claim 1, wherein the first command is further associated with the logging tool and wherein controlling further comprises controlling operation of the logging tool.

3. The method of claim 2, wherein the first command comprises at least one of an instruction to measure a geological parameter, an instruction to actuate a device in the logging tool, an instruction for moving the logging tool from a first position, an instruction for applying power to the logging tool or to the hoist device, an instruction for removing power from the logging tool or from the hoist device, and an instruction for modifying measurement parameters utilized by the logging tool.

4. The method of claim 2, wherein the first communication signal comprises a wireless communication signal.

5. The method of claim 4, wherein transmitting the first communication signal, comprises:
inducing a first communication device operably communicating with the first computer to transmit the wireless communication signal having the first command;
receiving the wireless communication signal at a second communication device; and
sending the first command from the second communication device to the second computer.

6. The method of claim 2, further comprising:
receiving at least one measured parameter from the logging tool by the second computer; and
transmitting a second communication signal having the at least one measured parameter to the first computer and displaying the measured parameter on a display device operably coupled to the first computer.

7. The method of claim 6, wherein the second communication signal comprises a wireless communication signal.

8. The method of claim 7, wherein the step of transmitting the second communication signal comprises:
inducing a second communication device operably communicating with the second computer to transmit the wireless communication signal having the measured parameter;
receiving the wireless communication signal at a first communication device operably communicating with the first computer; and
sending the measured parameter from the first communication device to the first computer.

9. The method of claim 6, wherein the measured parameter comprises at least one of a resistivity value, a density value, a porosity value, a natural gamma radiation value, a borehole image, an acoustic travel time value, a nuclear magnetic resonance value, a pressure value, a well production value, and a residual hydrocarbon saturation value.

10. The method of claim 2, further comprising:
specifying a second command to initiate a diagnostic test for determining whether at least one of the second computer and the logging tool have degraded operational performance, utilizing the input device operably coupled to the first computer;
transmitting a second communication signal having the second command from the first computer to the second computer; and
performing the diagnostic test for determining whether at least one of the second computer and the logging tool have degraded operational performance, utilizing the second computer, the diagnostic test generating either a desired operational performance message or a degraded operational performance message.

11. The method of claim 10, further comprising transmitting a third communication signal having either the desired operational performance message or the degraded operational performance message from the second computer to the first computer.

12. The method of claim 11, further comprising
specifying a third command to modify an operational parameter associated with at least one of the second computer and the logging tool to improve operation of at least one of the second computer and the logging tool, utilizing the input device operably coupled to the first computer;
transmitting a fourth communication signal having the third command from the first computer to the second computer; and
modifying operation of at least one of the second computer and the logging tool based on the third command having the operational parameter.

13. A system for remotely controlling logging equipment in a drilled hole, comprising:
a first computer configured to allow an operator to specify a first command associated with a hoist device coupled to a logging tool, the first computer being located at a position remote from the logging tool;
a first communication device operably communicating with the first computer configured to transmit a first communication signal having the first command;
a second communication device configured to receive the first communication signal; and
a second computer operably communicating with the second communication device, the second computer configured to control operation of the hoist device based on the first command.

14. The system of claim 13, wherein the first computer is further configured to allow the operator to specify the first command to be further associated with the logging tool and wherein the second computer is further configured to control operation of the logging tool.

15. The system of claim 14, wherein the first command comprises at least one of an instruction to measure a geological parameter, an instruction to actuate a device in the logging tool, an instruction for moving the logging tool from a first position, an instruction for applying power to the logging tool or to the hoist device, an instruction for removing power from the logging tool or from the hoist device, and an instruction for modifying measurement parameters utilized by the logging tool.

16. The system of claim 14, wherein the first communication signal comprises a wireless communication signal.

17. The system of claim 14, wherein the first computer is further configured to induce the first communication device to transmit the wireless communication signal having the first command, the second communication device further configured to receive the wireless communication signal, the second communication device further configured to send the first command to the second computer.

18. The system of claim 14, wherein the second computer is further configured to receive at least one measured parameter from the logging tool, the second computer further configured to transmit a second communication signal having the measured parameter to the first computer, the first computer further configured to display the measured parameter on a display device operably coupled to the first computer.

19. The system of claim 18, wherein the second communication signal comprises a wireless communication signal.

20. The system of claim 19, wherein the second computer is further configured to induce the second communication device to transmit the wireless communication signal having the measured parameter, the first communication device further configured to receive the wireless communication signal, the first communication device further configured to send the measured parameter to the first computer.

21. The system of claim 18, wherein the measured parameter comprises at least one of a resistivity value, a density value, a porosity value, a natural gamma radiation value, a borehole image, an acoustic travel time value, a nuclear magnetic resonance value, a pressure value, a well production value, and a residual hydrocarbon saturation value.

22. The system of claim 14, wherein the first computer is further configured to allow an operator to specify a second command to initiate a diagnostic test for determining whether at least one of the second computer and the logging tool has degraded operational performance, the first computer further configured to transmit a second communication signal having the second command to the second computer, the second computer further configured to perform the diagnostic test for determining whether at least one of the second computer and the logging tool has degraded operational performance, the diagnostic test generating either a desired operational performance message or a degraded operational performance message.

* * * * *